United States Patent
Madden

(10) Patent No.: US 7,369,273 B2
(45) Date of Patent: May 6, 2008

(54) GRAYSCALE MISTRACKING CORRECTION FOR COLOR-POSITIVE TRANSPARENCY FILM ELEMENTS

(75) Inventor: Thomas E. Madden, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 781 days.

(21) Appl. No.: 10/899,755

(22) Filed: Jul. 27, 2004

(65) Prior Publication Data

US 2006/0023233 A1    Feb. 2, 2006

(51) Int. Cl.
*H04N 1/56* (2006.01)
*H04N 1/60* (2006.01)

(52) U.S. Cl. .................................. 358/1.9; 358/520

(58) Field of Classification Search ................ 358/1.9, 358/3.21, 3.26, 518, 521, 506; 382/167
See application file for complete search history.

(56) References Cited

U.S. PATENT DOCUMENTS 4,825,297 A * 4/1989 Fuchsberger et al. ....... 358/447
5,726,779 A * 3/1998 Kadowaki et al. .......... 358/520

* cited by examiner

*Primary Examiner*—Scott A. Rogers
(74) *Attorney, Agent, or Firm*—Robert Luke Walker

(57) ABSTRACT

In a color image transformation method and system, a photographic color-positive transparency media bearing a captured image is transmission scanned to provide a scanned image. The scanned image has an overall cyan-blue color balance and has grayscale mistracking relative to colorimetric chromaticity. The scanned image is automatically transformed to intermediary color image data encoding values. Both the overall cyan-blue color balance and the mistracking are corrected during the transforming.

20 Claims, 6 Drawing Sheets

GRAYSCALE MISTRACKING CORRECTION FOR COLOR-POSITIVE TRANSPARENCY FILM ELEMENTS

FIELD OF THE INVENTION

The invention relates generally to digital color-image reproduction methods and systems and more particularly relates to correction of grayscale mistracking correction in images digitized from color-positive transparency film elements.

BACKGROUND OF THE INVENTION

Photographic color-positive transparency films, such as 35 mm (Type 135) slides and larger-format sheet films, are commonly used to capture and reproduce original images. Color-positive transparency films are well suited for these applications because they are capable of extraordinary image quality, producing images exhibiting high sharpness, low noise, extensive luminance dynamic range, and large color gamut. Color-positive transparency films are designed so that the images they produce will have an appropriate appearance when illuminated and viewed by projection in a darkened room, or by back-illumination.

Color-image reproduction systems known in the art permit images to be captured by color-transparency film media as well as by other dissimilar image-receptive media or devices, possibly digitized and stored, and then output onto complementary media. So, for instance, color images may be captured on color-positive photographic media, and then illuminated and viewed directly by projection in a darkened room or by back-illumination, or copied onto larger or smaller transparencies, or printed onto positive photographic paper. Such images may or may not pass through a digital intermediary. In another case, color images may be first captured on negative film and then reproduced on negative photographic paper. Again, such images may or may not pass through a digital intermediary. In yet another case, color images may be captured as an electronic signal by a digital-still or video camera, and then viewed on an electronic display or converted to print by a device such as a thermal printer. Again, such images may or may not pass through a digital intermediary. The foregoing are just some examples of color-image reproduction systems.

Color-imaging systems in which the image passes through a digital intermediary allow improvements to be made to an image using a single means, which may be a digital computer. Thus, improvements to an image's color and tone scale, as well as to its sharpness and noise, can be made in a convenient and adaptable way. Furthermore, if the imaging system includes a means for rapid viewing of the changes, the content of an image can also be edited in a convenient fashion. Many of these types of improvements are known to those skilled in the art. For example, U.S. Pat. No. 4,500,919 entitled "COLOR REPRODUCTION SYSTEM" by W. F. Schreiber, discloses an image-reproduction system of one type in which an electronic reader scans an original color image and converts it to an electronic image. A computer workstation and an interactive operator interface, including a video monitor, permit an operator to edit an image by means of displaying it on the monitor. When the operator has composed a desired image on the monitor, the workstation causes the output-writer device to make an inked output of the reproduced image.

U.S. Pat. No. 5,956,044 entitled "IMAGING DEVICE TO MEDIA COMPATIBILITY AND COLOR APPEARANCE MATCHING WITH FLARE, LUMINANCE, AND WHITE POINT COMPARISON" by E. J. Giorgianni and T. E. Madden describes a system for producing intermediary image-bearing signals and/or encoded data compatible for subsequent imaging applications from disparate and inherently incompatible types of input imaging devices and media, including color-positive transparency media. The invention gives consideration to the input and output-image viewing environments in terms of their viewing-illuminant spectral energy distribution, amount of viewing flare light, surround type, and observer adaptive white point chromaticities. Application of the methods and means of that invention produces intermediary image-bearing signals and/or data that can be output onto any of a plurality of image-receptive media and/or image-forming devices such that any output image should match the appearance of any input image based on the capabilities and limitations of the specific output device and/or medium and on the specific application for which the image is being produced. Digital color-signal processing transforms are applied to input image data based on differences in the viewing conditions for the input image and a set of defined reference viewing environment.

Many color-positive transparency film images have cyan-blue balanced reproduced neutrals, which appear achromatic to a human observer when viewing the projected film image in a darkened room. That is because an observer's visual system tends to adapt to the projected image itself due to the lack of visual cues in the darkened viewing environment. In a typical darkened film-projection viewing environment however, that adaptation is not complete due to the highly reddish-yellow projector lamp chromaticity, the fairly low absolute luminance level of the projected image, and the fact that the projected images fills only a portion of the observer's field of view. The overall measured cyan-blue color balance of the color-positive transparency film image, combined with the observer's partial or incomplete chromatic adaptation to the described projection conditions, results then in images that appear to be properly color balanced. The effect of the observer's partial or incomplete chromatic adaptation is addressed in U.S. Pat. No. 5,956,044 through the use of a chromatic adaptation transform, such as a VonKries transformation matrix, or by using any of a number of other techniques known to those skilled in the art.

The overall cyan-blue color balance of most color-positive photographic transparency film media results from the intentional design and manufacturing of film. FIG. 1 shows the cyan, magenta, and yellow density scales for a typical photographic color-transparency film. The unequal CMY density values of the reproduced grayscale shown produce the desirable cyan-blue color balance described earlier, i.e. at a given scene luminance-factor value, there is a greater amount of cyan and a lesser amount of yellow density produced. The overall cyan-blue color balance resulting from these unequal density values is considered in the above cited-references, but only in relation to white-balancing and observer chromatic adaptation.

Application of a sequence of transforms to modify images is taught by U.S. Pat. Nos. 5,452,111; 5,420,979; and 5,786,823.

It would thus be desirable to provide methods and systems for encoding image data derived from photographic color-transparency films such that images reproduced from the image data derived from such media appear appropriately rendered without requiring references to their origin.

SUMMARY OF THE INVENTION

The invention is defined by the claims. The invention, in broader aspects, provides a color-image transformation method and system, in which a photographic color-positive transparency media bearing a captured image is transmission scanned to provide a scanned image. The scanned image has an overall cyan-blue color balance and has grayscale mistracking relative to calorimetric chromaticity. The scanned image is automatically transformed to intermediary color image data encoding values. Both the overall cyan-blue color balance and the chromaticity mistracking are corrected during the transforming.

It is an advantageous effect of the invention that improved methods and systems for encoding image data derived from photographic color-transparency films are provided, such that images can be reproduced from the image data derived from such media and appear appropriately rendered without requiring references to their origin.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIG. 2 graphs CIE x,y chromaticity values vs. log scene luminance-factor value.

DETAILED DESCRIPTION OF THE INVENTION

Neutral-colored (achromatic) original-scene objects, properly exposed onto photographic color-positive transparency media, such as slide film, reproduce on the film and measure, either densitometrically or calorimetrically, as somewhat cyan-blue in overall color balance. Photographic color-positive transparency media images also have a reproduced grayscale characteristic that does not exhibit constant colorimetric chromaticity tracking. This contrasts with the constant colorimetric chromaticity tracking provided by imaging media and devices designed to produce images for viewing in normal-surround conditions.

Figure 1:
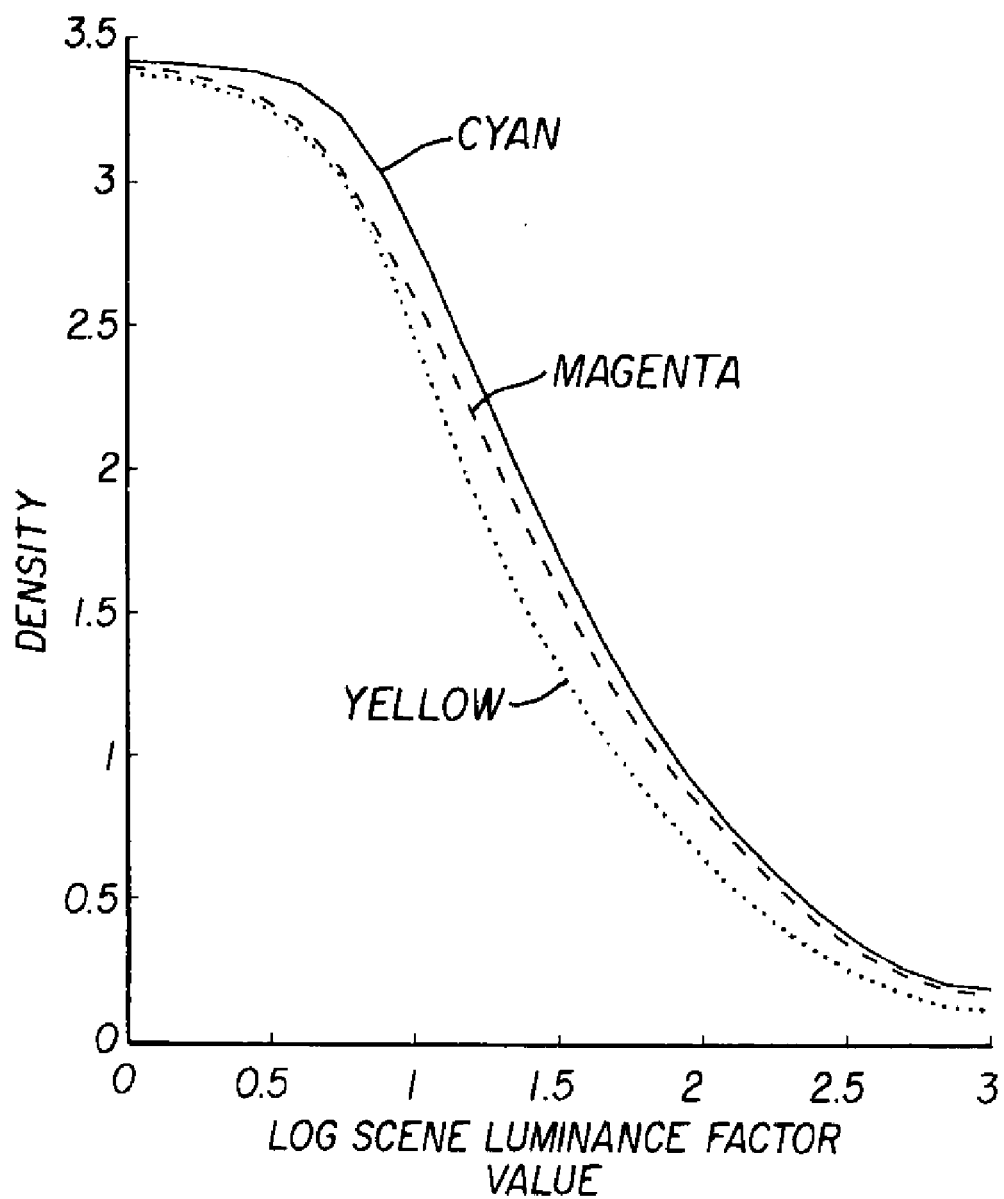
FIG. 1 is a graph of reproduced grayscale for a photographic color-positive transparency medium. Reproduced density is graphed vs. relative log scene luminance-factor value.
Figure 2:
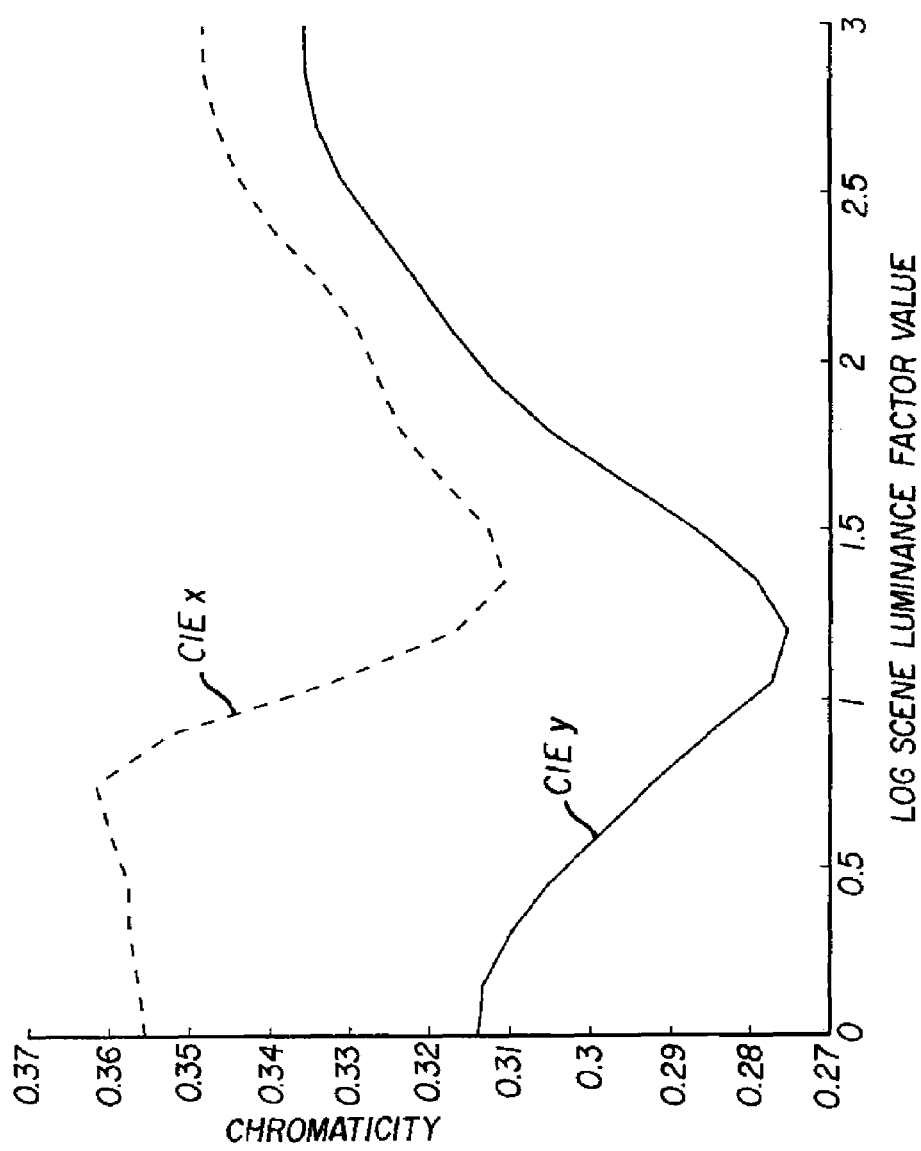
FIG. 2 is another graph of reproduced grayscale for the same medium as FIG. 1.

FIGS. 1 and 2 are graphs of a reproduced grayscale for a typical photographic color-positive transparency medium, KODAK EKTACHROME Professional E100S Film, marketed by Eastman Kodak Company of Rochester, N.Y. FIG. 1 graphs reproduced density vs. relative log scene luminance-factor value (for purposes of illustration shown as values in the range of 0-3.0). FIG. 2 graphs CIE x,y chromaticity values vs. log scene luminance-factor value. The grayscale chromaticity mistracking shown in FIG. 2 typically is not visually detectable in dark-projected images by observers adapted to the unique conditions of the dark-projection viewing environment.

When images from color-positive transparency media are used as input to a color-imaging system according to the disclosure of U.S. Pat. No. 5,956,044, this grayscale mistracking is retained in the intermediary image data, despite utilization of a chromatic adaptation transform to account for the overall cyan-blue color balance of the input image. The grayscale chromaticity mistracking encoded in intermediary image data derived from input color-positive transparency film images is subsequently present in output images, which may be intended for viewing in normal-surround conditions, produced from the intermediary image data. The magnitude of this chromaticity grayscale mistracking may be magnified in such intermediary image data and/or output images depending upon the nature of the color-signal processing transforms used to create them, the order in which the transforms are applied, and the magnitudes of the numerical factors and coefficients of the transforms themselves.

One result of the retained grayscale mistracking in intermediary image data is a degree of incompatibility between images encoded from color-positive transparency media and other types of imaging media and devices used for input to a system. A further result is visibly obvious and objectionable color artifacts, such as chromatic neutral highlight and/or shadow reproduction when neutral midtones are achromatically balanced, in output images produced on output imaging media and devices from such intermediary interimage data for viewing in normal-surround conditions.

In the methods and systems herein, input image data derived from rendered color-positive transparency film originals, intended to be viewed under specified viewing conditions, are encoded so as to provide an improved degree of compatibility with image data derived from other types of rendered and unrendered input image sources. Resulting images can be output onto any of a plurality of image-receptive media or image-forming devices so that the reproduced images appear appropriately rendered for the output medium or device chosen regardless of the input image origin. The images or portions thereof from various media and devices may be merged together to produce composite images of homogeneous and appropriate appearance. The images may be stored for later use, balanced, otherwise manipulated or adjusted without requiring references to their origin. The color imaging systems herein have the capability of producing copies, other forms of appearance matches, and other forms of appropriately rendered images from any input image, while additionally improving the capability of matching the appearance of said color-positive transparency film input images or otherwise producing appropriately rendered images on any of a plurality of output devices and/or media for any of a plurality of viewing conditions.

In the methods and systems herein, the image-bearing signals are produced by scanning, using a transmission scanner, images which are contained on a color-positive transparency film element. The rendered input images, that is, input images in a form intended to be viewed directly, are converted to an image manipulation and/or storage encoding, which is equal to the corresponding calorimetric values that would be required to match, in the viewing conditions of a defined reference viewing environment, the appearance of said input images as they would appear if viewed in a specified input-image viewing environment. The viewing conditions of the reference viewing environment may correspond to an actual viewing environment, or they may instead correspond to an idealized viewing environment. The viewing conditions of the color-positive transparency film input-image viewing environment may correspond to an actual color-positive transparency film viewing environment, or they may instead correspond to those of a viewing environment generally intended for that type of input imaging medium.

In the following description, some embodiments of the present invention will be described as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

The computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 3:
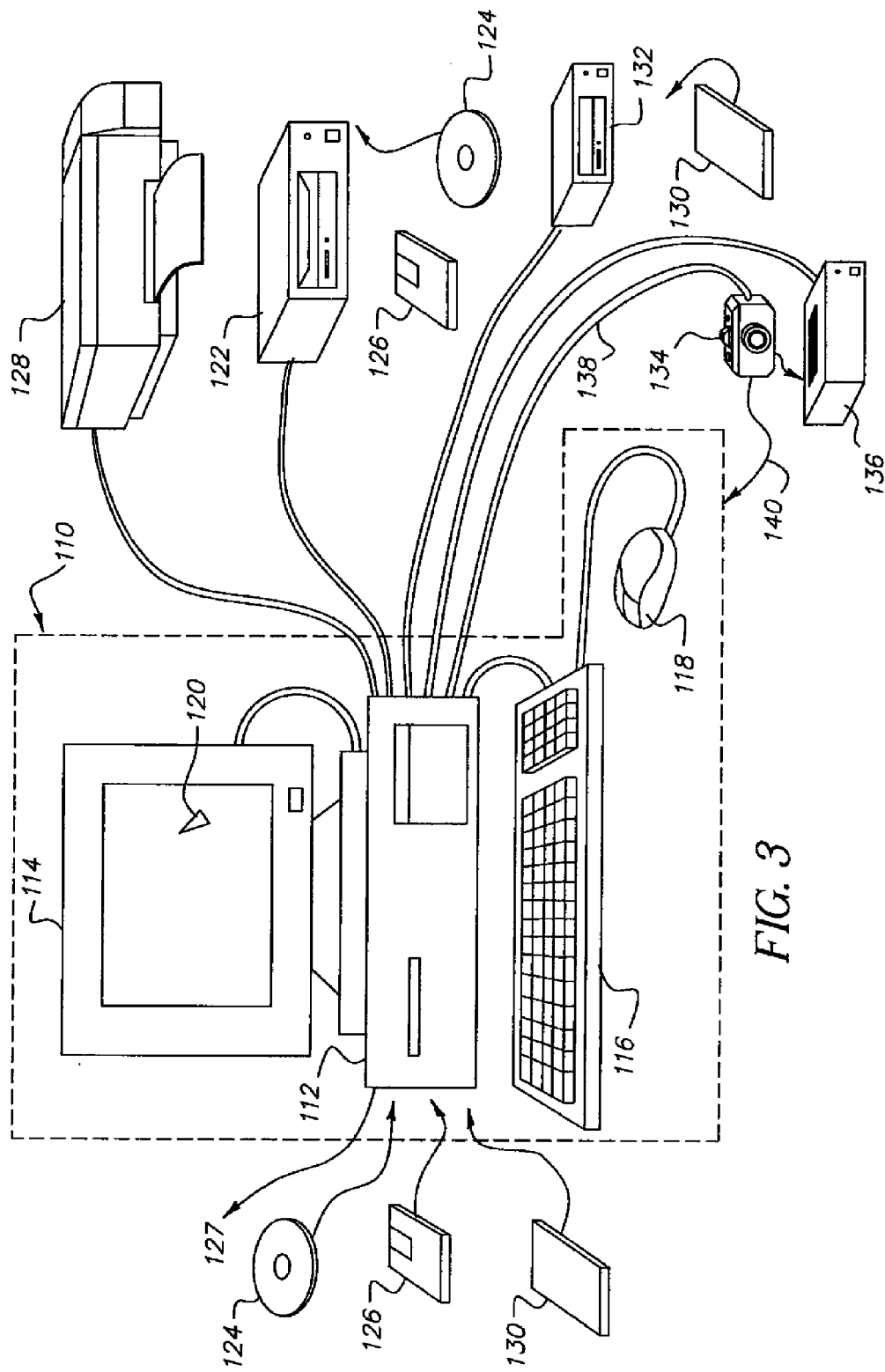
FIG. 3 is a diagrammatical view of an embodiment of the system.

The present invention may be implemented in computer hardware. Referring to FIG. 3, there is illustrated a computer system 110 for implementing the present invention. Although the computer system 110 is shown for the purpose of illustrating a preferred embodiment, the present invention is not limited to the computer system 110 shown, but may be used on any electronic processing system such as found in home computers, kiosks, retail or wholesale photofinishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 124, which typically includes software programs, is inserted into the microprocessor based unit for providing a means of inputting the software programs and other information to the microprocessor based unit 112. In addition, a floppy disk 126 may also include a software program, and is inserted into the microprocessor-based unit 112 for inputting the software program. The compact disk-read only memory (CD-ROM) 124 or the floppy disk 126 may alternatively be inserted into externally located disk drive unit 122 which is connected to the microprocessor-based unit 112. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 may also be connected to the microprocessor-based unit 112 for printing a hardcopy of the output from the computer system 110.

Images may also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor based unit 112 for permitting visual display of the image on the display 114. Alternatively, the PC card 130 can be inserted into an externally located PC card reader 132 connected to the microprocessor-based unit 112. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera (not shown) or a scanner (not shown). Images may also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

The output device provides a final image that has been subject to the transformations. The output device can be a printer or other output device that provides a paper or other hard copy final image. The output device can also be an output device that provides the final image as a digital file. The output device can also includes combinations of output, such as a printed image and a digital file on a memory unit, such as a CD or DVD.

The present invention can be used with multiple capture devices that produce digital images. For example, FIG. 3 can represent a digital photofinishing system where the image-capture device is a conventional photographic film camera for capturing a scene on color negative or reversal film, and a film scanner device for scanning the developed image on the film and producing a digital image. The capture device can also be an electronic capture unit (not shown) having an electronic imager, such as a charge-coupled device or CMOS imager. The electronic capture unit can have an analog-to-digital converter/amplifier that receives the signal from the electronic imager, amplifies and converts the signal to digital form, and transmits the image signal to the microprocessor-based unit 112.

The microprocessor-based unit 112 provides the means for processing the digital images to produce pleasing looking images on the intended output device or media. The present invention can be used with a variety of output devices that can include, but are not limited to, a digital photographic printer and soft copy display. The microprocessor-based unit 112 can be used to process digital images to make adjustments for overall brightness, tone scale, image structure, etc. of digital images in a manner such that a pleasing looking image is produced by an image output device. Those skilled in the art will recognize that the present invention is not limited to just these mentioned image processing functions.

The general control computer shown in FIG. 3 can store the present invention as a computer program product having a program stored in a computer readable storage medium, which may include, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device. Before describing the present invention, it facilitates understanding to note that the present invention is preferably utilized on any well-known computer system, such as a personal computer.

It should also be noted that the present invention can be implemented in a combination of software and/or hardware and is not limited to devices which are physically connected and/or located within the same physical location. One or more of the devices illustrated in FIG. 3 may be located remotely and can be connected via a network. One or more of the devices can be connected wirelessly, such as by a radio-frequency link, either directly or via a network.

The present invention may be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better—or even just to change them), digital fulfillment (digital images in—from media or over the web, digital processing, with images out—in digital form on media, digital form over the web, or printed on hard-copy prints), kiosks (digital or scanned input, digital processing, digital or hard copy output), mobile devices (e.g., PDA or cell phone that can be used as a processing unit, a display unit, or a unit to give processing instructions), and as a service offered via the World Wide Web.

In each case, the invention may stand alone or may be a component of a larger system solution. Furthermore, human interfaces, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the method of the invention can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art.

A digital image includes one or more digital image channels or color components. Each digital image channel is an array of pixels. Each pixel value relates to the amount of light received by the imaging capture device at the physical region of the pixel. For color imaging applications, a digital image will often consist of red, green, and blue digital image channels. Motion imaging applications can be considered a sequence of digital images and can be processed as individual images or by processing a first image in a particular sequence and estimating changes necessary for succeeding images. Those skilled in the art will recognize that the present invention can be applied to, but is not limited to, a digital image channel for any of the above mentioned applications. Although a digital image channel is described as a two dimensional array of pixel values arranged by rows and columns, those skilled in the art will recognize that the present invention can be applied to non-rectilinear arrays with equal effect. Those skilled in the art will also recognize that for digital image processing steps described hereinbelow as replacing original pixel values with processed pixel values is functionally equivalent to describing the same processing steps as generating a new digital image with the processed pixel values while retaining the original pixel values.

Figure 4:
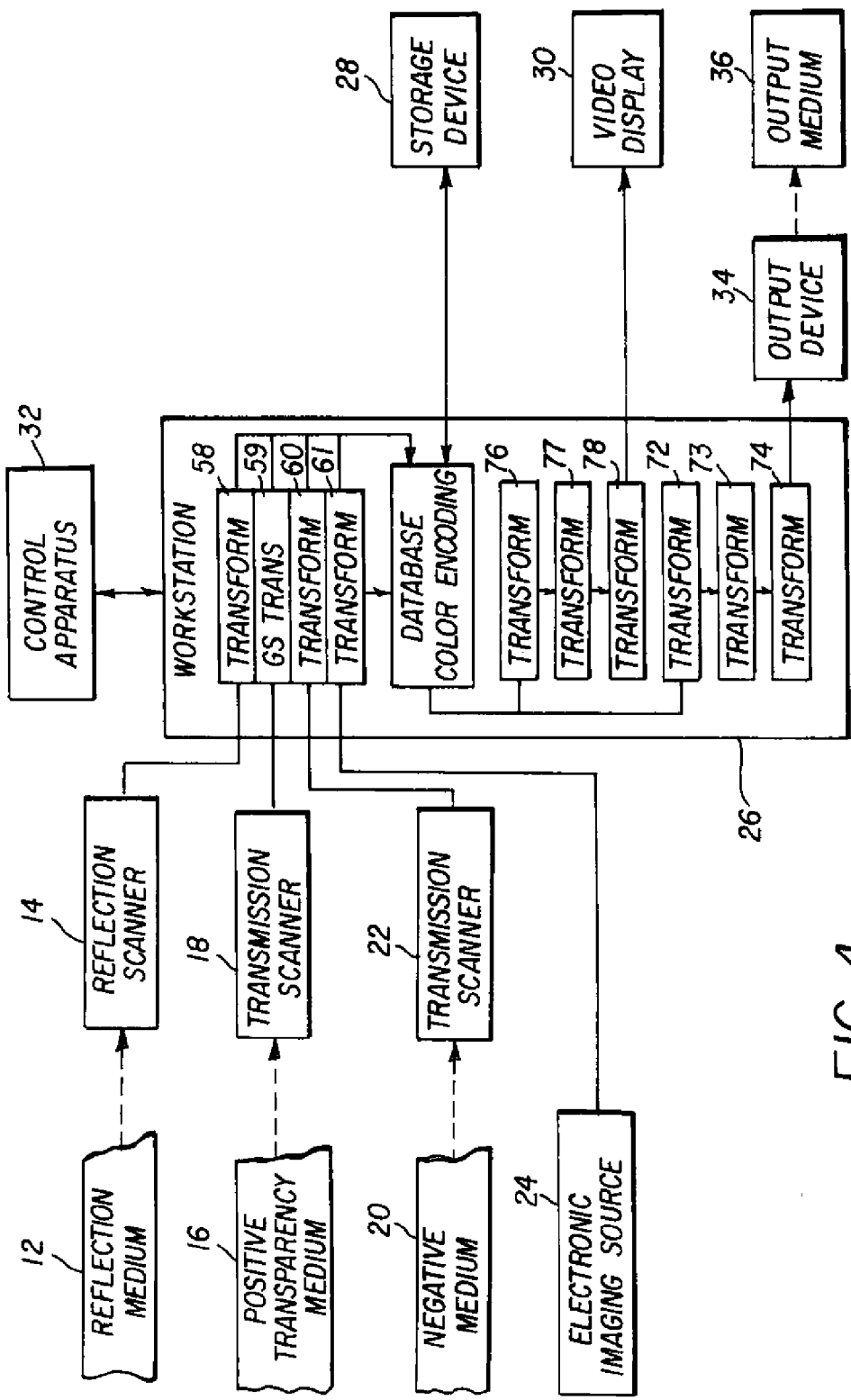
FIG. 4 is a diagrammatical view of another embodiment of the system.

Referring now to FIG. 4 a particular embodiment of the color-image reproduction system has one or more reflection-image scanners 14, which serve for scanning input images on one or more reflection media 12, and produce image-bearing signals in digital form for each picture element of the reflection image being scanned. One or more transmission image scanners 18, serve for scanning input images on one or more positive transparency media 16 and for producing image-bearing signals in digital form for each picture element of a positive transparency image being scanned. One or more transmission image scanners 22, serve for scanning input images on one or more negative film media 20 and for producing image-bearing signals in digital form for each picture element of the negative film image being scanned. The transmission scanner or scanners each have an illuminant that has a known spectral power distribution. This information is generally available for commercial scanners or can be assessed for an individual scanner using techniques known to those of skill in the art.

In addition, one or more electronic image sources 24, such as a charge-coupled-device (CCD) based digital-still or motion camera or an electronic image storage device/medium, serve to produce image-bearing signals in digital form for each picture element of a captured or stored image. A computer-based workstation 26, which receives the image-bearing signals, transforms the input image-bearing signals into intermediary color-image data encoding values. The workstation also allows for archival storage of the intermediary image data using any of a variety of archival storage devices 28, and media such as magnetic tape or disk, optical disk or other memory device. The workstation also enables the operator to modify (color and/or composition) the original image to construct the image for reproduction. For that purpose, a video display 30 serves to display an image corresponding to video-transformed image-bearing signals provided by the workstation. Control apparatus 32, which may include a keyboard and cursor, enables the operator to provide image manipulation commands pertinent to modifying the video image displayed and the reproduced image to be made or stored. One or more output devices, 34, which may be film writers, thermal, ink-jet, electrostatic, or other type of printers, or electronic output devices then receive modified and output-transformed image-bearing signals from the workstation for output onto appropriate image-receptive media 36.

The image-bearing signals produced by the transmission scanner or scanners are converted to an image manipulation and storage encoding, hereafter referred to as Database Color Encoding. In that encoding, the image-bearing signals have colorimetric values matched to the appearance of a positive input image as that image would appear if viewed in a specified input-image viewing environment. This allows compatibility of images from different sources, such as reflection scanners and media, transmission scanners and positive transparency media, transmission scanners and negative media, and images obtained from various electronic imaging sources. Image-bearing signals derived from negative media and from electronic imaging sources are converted to rendered calorimetric values consistent with the reference viewing environment of the Database Color Encoding.

The specified input-image viewing environment may correspond to an actual input-image viewing environment or to a viewing environment generally associated with the type of media being used for input. The reference viewing environment need not correspond to any actual environment. It may instead be defined to be conceptually or mathematically convenient, for example. The reference viewing environment is, however, uniquely defined in terms of surround, adaptive white point, and viewing flare. All of these terms are used in an ordinary sense, in terms of digital image processing.

Surround can be defined as a description of the relationship of the luminance and chrominance of the light illuminating the image to the luminance and chrominance of the areas immediately surrounding the image.

Adaptive white point can be defined as a white reference, the luminance of which would appear to correspond to that produced by a 100 percent diffuse reflecting or transmitting white object, and the chromaticities of which would appear achromatic (neutral) to an observer adapted to the viewing environment.

Viewing flare can be defined as the amount of non-image stray light in the environment that reaches the eyes of the observer, which may be expressed as a percentage of the luminance level associated with the reproduction of a 100 percent diffuse reflecting or transmitting white object in the original scene.

In addition to defining the specified viewing environment for each input image in terms of surround, adaptive white point, and viewing flare, the spectral power distribution of the input-image viewing illuminant must be specified in order to perform the required colorimetric measurements and/or computations.

The color-signal processing transform suitable to account for the input color-transparency medium's grayscale chromaticity tracking characteristic can be determined as described below. Other aspects of the transforming of a set of calorimetric values for a given picture element of an input image derived from color-positive transparency film, intended to be viewed in a dark surround, to a set of visually corresponding colorimetric values for an image intended to be viewed in a normal-surround reference viewing environment may be performed according to the teachings of the invention of U.S. Pat. No. 5,956,044 or by using any of a number of other techniques known to those skilled in the art.

The operations required to perform the input transformations of this invention may consist of a sequence of matrix operations, 1-dimensional look-up tables, polynomial or other mathematical expressions, 3-dimensional look-up tables, or other computational techniques. The following discussion is generally directed to the use of three one-dimensional lookup tables (1-D LUTs). The use of input transformations in other forms will be apparent to those of skill in the art from this discussion.

Three one-dimensional lookup tables (1-D LUTs) may be derived to account for the slide-film's grayscale chromaticity tracking based on the grayscale characteristic of the specific chemically processed medium used for input. A typical color-transparency film's grayscale characteristic also may be used derive this transform and be used for one or more specific input color-transparency films, as most such films commonly available have very similar grayscale tracking characteristics.

It will be appreciated that said lookup tables can operate directly on the scanned input-image's XYZ colorimetric values, or may operate on a nonlinear version of such quantities, such as the logarithm, to possibly reduce digital quantization artifacts. The tables also may be computed and applied in terms of standard densitometric values, such as those defined by ANSI Status A, or those corresponding to a specific densitometric response. Other metrics and nonlinearities may be used as well, such as analytical dye amounts.

It also will be appreciated that custom tables may be computed for each particular input color-transparency film and chemical process condition, or a smaller number of at least one such transform may be applied to multiple input color-transparency films and chemical processing conditions with satisfactory results. Corrections can also be computed for each input image individually, from a known pattern grayscale chart embedded in the input image or supplied with the input image.

Figure 5:
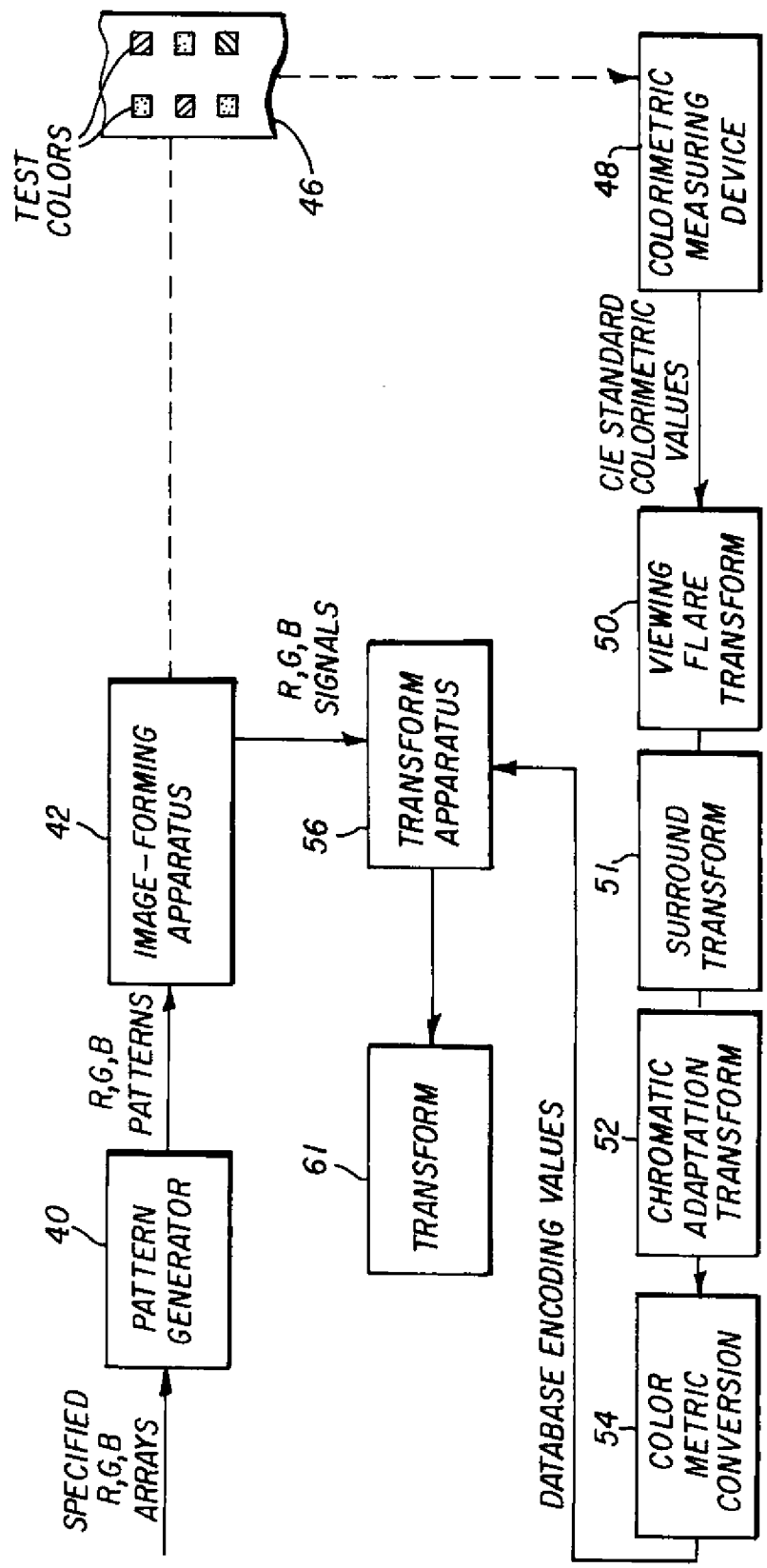
FIG. 5 is a more detailed diagrammatical view of a portion of the system of FIG. 4.

The 1-D lookup tables can be generated in a manner similar to the generation of colorimetric tables for color calibration. Referring to FIG. 5, in the calorimetric procedure, patterns of specified arrays of R, G, B (red, green, and blue) exposure values or other image-forming values, chosen to produce colors which adequately sample and cover the useful color range of the color-positive transparency film medium 16 to be calibrated, are created by pattern generator 40 and are fed to image-forming apparatus 42. The image-forming apparatus produces one or more test images 46, consisting of approximately 400 test colors on the positive transparency medium 16. The test images may be created using a variety of methods appropriate for the application. These methods would include, but would not be limited to, using an exposing apparatus such as a sensitometer, using the output device of a color imaging apparatus, or directly recording images of test objects from original illuminated test objects or reproductions of test objects on intermediary imaging media. The color-positive transparency medium is then processed chemically or by other means appropriate for the specific medium to produce the test images 46. Measuring device 48 then determines the calorimetric values for each test color of the test images. Colorimetric measuring device 48 may utilize, for example, spectrophotometric, spectroradiometric, or calorimetric measurements and colorimetric computational techniques known to those skilled in the art, for the specified illuminant of the viewing environment for the input color-positive transparency medium.

Figure 6:
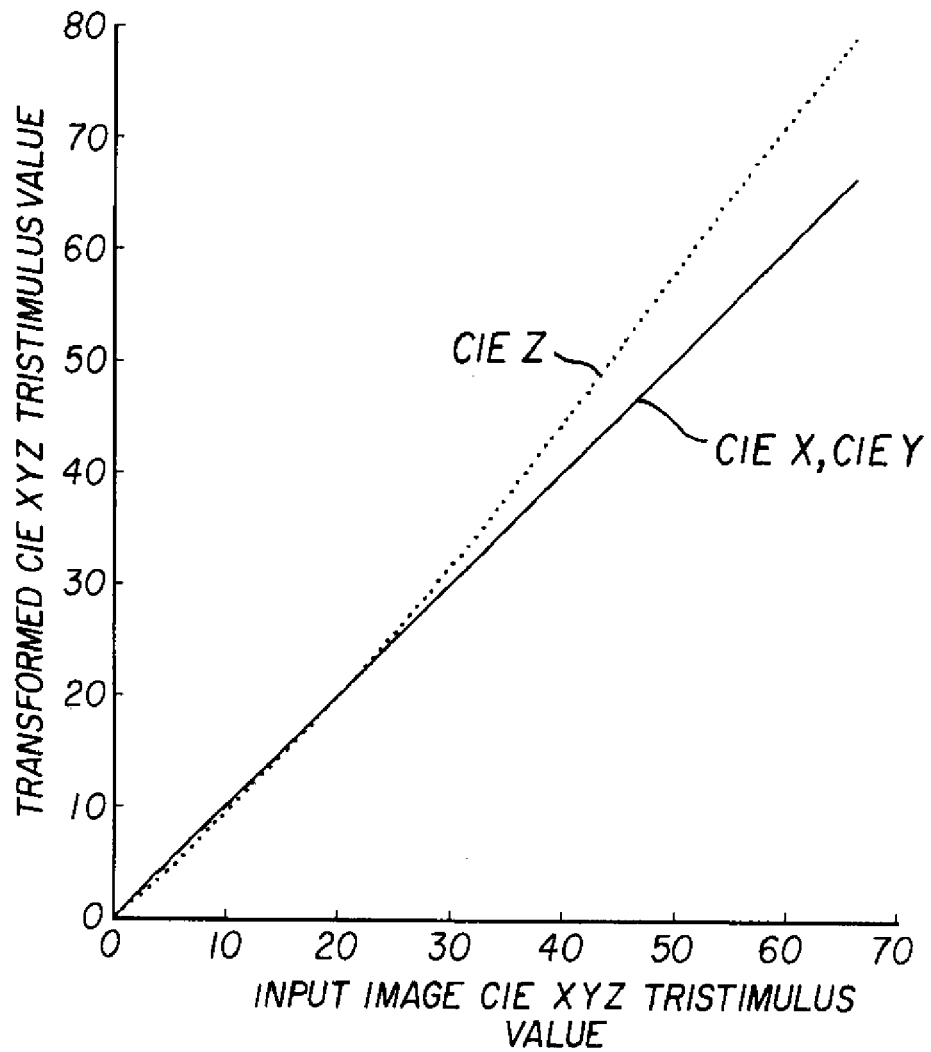
FIG. 6 is a graph of a representative set of 1-D LUTs of the method and system.

In generating the set of 1-D lookup tables, a sequence of specified R, G, B (red, green, and blue) exposure values or other image-forming values are chosen to represent neutral colors which adequately sample and cover the useful grayscale range of each of the color channels of the color-positive transparency film medium 16 to be calibrated. The patterns are created by pattern generator 40 and are fed to image-forming apparatus 42. The image-forming apparatus produces one or more test images 46, consisting of approximately twenty or more test colors on the positive transparency medium 16. The test images may be created using a variety of methods appropriate for the application. These methods include, but are not limited to, using an exposing apparatus such as a sensitometer, using the output device of a color imaging apparatus, or directly recording images of neutral test objects from original illuminated neutral test objects or reproductions of neutral test objects on intermediary imaging media. The color-positive transparency medium is then processed chemically or by other means appropriate for the specific medium to produce the test images 46. Measuring device 48 then determines the XYZ calorimetric values for each neutral test color of the test images. Colorimetric measuring device 48 may utilize, for example, spectrophotometric, spectroradiometric, or colorimetric measurements and colorimetric computational techniques known to those skilled in the art, for the specified illuminant of the viewing environment for the input color-positive transparency medium. A set of corresponding transformed calorimetric values is computed from the Y tristimulus values measured from the reproduced neutral test colors and a selected reference pair of CIE x, y chromaticity coordinates. These may correspond to the chromaticity coordinates for a representative step in the test-image grayscale sequence, for example representative of the exposure from a 20 or 40 percent reflector, or some other chosen reference. The corresponding transformed X and Z tristimulus values for the test colors are computed from the test-color sequence of measured Y tristimulus values and the chosen x, y reference chromaticities using standard CIE colorimetric equations known by those skilled in the art, thus deriving a set of transformed XYZ calorimetric values for the test-color neutrals of constant chromaticity. The set of 1-D lookup tables relating to the measured or otherwise computed colorimetric values for the input image to the transformed constant-chromaticity calorimetric values computed as described above for each test color in the grayscale sequence then can be created by using interpolation techniques commonly used in creating digital lookup tables. A representative set of such 1-D LUTs is shown graphically in FIG. 6.

In the system, transmission scanner 18 reads test images 46 and produces image-bearing signals corresponding to each test color contained therein. Transform apparatus 56 then creates transform 59 (labelled "GS TRANS" 59 in FIG. 4) relating the image-bearing signal values for the input color-transparency medium colors to the determined Database Color Encoding values of the corresponding test colors.

Color-balance adjustments, or adjustments to the adaptive white point chromaticities commonly used for computing a chromatic adaptation transform may need to be applied, depending on the selected reference x, y chromaticities from which the grayscale-tracking transform is derived.

If the surround for the specified color-positive transparency medium's input-image viewing environment is defined as a dark surround and differs from that of the encoding reference viewing environment, the computed calorimetric values must be transformed by the grayscale-tracking transform 59 to corresponding calorimetric values for the reference viewing environment that would exhibit an appropriately reproduced grayscale.

If the amount of viewing flare in the specified input-image viewing is different from that of the reference viewing environment, the computed colorimetric values must be transformed by the viewing-flare transform 50 to the corresponding colorimetric values for the amount of flare specified for the reference viewing environment. This transformation may be performed by adding or subtracting, as appropriate, the difference between the amounts of flare light according to the teachings of the invention of U.S. Pat. No. 5,956,044 or by using any of a number of other techniques known to those skilled in the art.

The transformed calorimetric values are then further transformed by a surround-transform 51 in order to account for the difference between the surround of the reference viewing environment and the surround specified for the color-positive transparency medium input-image viewing environment.

In particular, a surround factor S of surround-transform 51 is used to account for a perceptual effect, known to those skilled in the art as lateral-brightness inhibition, which may be induced by an image's surround and which may alter an observer's perception of image luminance contrast. The value of this surround factor S, which is defined to have a value of 1.0 for a normal surround in which the illumination of the image is similar in luminance to the luminance of the surround, is affected by factors such as absolute luminance levels, image size, and other factors. The determination of the value of the surround factor is best done by psychophysical experiments in which the observer, successively adapted to each viewing environment, identifies images that appear to match in luminance contrast.

For example, if the input-image viewing environment is specified to have a dark surround, as for projected color-transparency film images, and the surround of the reference viewing environment is specified as normal, then the first-transformed colorimetric values must be further transformed to account for the perceived lowering of the luminance contrast induced by the dark surround. This transform may be performed according to the teachings of the invention of U.S. Pat. No. 5,956,044 or by using any of a number of other techniques known to those skilled in the art.

In addition, luminance factors $\beta_d$ and $\beta_n$ of surround-transform 51 are used to account for a second perceptual effect, known to those skilled in the art as general-brightness adaptation, which causes the observer to discount differences in overall image brightness. The determination of the luminances of the adaptive white points of the input-image and reference viewing environments are again best done by psychophysical experiments in which the observer, adapted to the viewing environment, identifies a stimulus which appears to be achromatic and which appears to correspond to a 100% diffuse reflecting white object.

If the adaptive white point of the specified color-positive transparency film input-image viewing environment is different in chromaticity from that of the reference viewing environment, the transformed calorimetric values must be further transformed by the chromatic adaptation transform 52 to the corresponding calorimetric values for the adaptive white point of the reference viewing environment. In some cases, the chromaticities of the adaptive white point will correspond to the chromaticities of the viewing illuminant. In other cases, however, observer chromatic adaptation may be partial or incomplete. As a result, the chromaticities that would appear achromatic to the observer may be different than those of the viewing illuminant. The degree of completeness of the chromatic adaptation will depend on the absolute luminance level of the viewing environment, the particular chromaticity values of the illuminant, and other factors. The determination of the adaptive white point is again best done by psychophysical experiments in which the observer, adapted to the viewing environment, identifies a stimulus which appears to be achromatic and which appears to correspond in luminance to a 100% diffuse reflecting object. This transformation may be performed by using a chromatic adaptation transform, such as a VonKries transformation matrix, or by using any of a number of other techniques known to those skilled in the art.

The values from the chromatic adaptation transform 52 may be further transformed by color metric conversion 54, for example, to convert from CIE XYZ units to CIE 1976 L*a*b* units, to form the Database Color Encoding values. The Database Color Encoding values represent the corresponding colorimetric values that would be required to match, in the viewing conditions of the reference viewing environment, the appearance of an input image, on the color-positive transparency medium calibrated, as that image would appear if viewed in the specified input-image viewing environment.

Referring again to FIG. 3, transform 59 is used in workstation 26 to transform images on color-positive transparency medium 16 and scanned on transmission scanner 18 to Database Color Encoding values. Consistent with the objects of this invention, all positive transparency input images so transformed are compatible with each other; moreover, they achieve improved compatibility with input images originating on disparate imaging media and/or devices, such as those on reflection medium 12, transformed according to the teachings of the invention of U.S. Pat. No. 5,956,044. Transforms similar to transform 59, appropriate for images on color-positive transparency medium 16 but for different input-image viewing conditions, may be derived according to the methods of this embodiment and the teachings of invention of U.S. Pat. No. 5,956,044. Transforms appropriate for images on other color-positive transparency media and other types of media designed to be viewed in a surround condition that differs from that of the reference viewing environment, may also be derived according to the methods of this embodiment. Input images so transformed are made compatible with each other, consistent with the image-storage, image-adjustment, image-manipulation, and image-merging objects of this invention.

The encoding transforms of FIG. 3 associated with the other types of input imaging media and devices, namely transform 58 associated with input color-positive reflection media, transform 60 associated with input color-negative film media, and transform 61 associated with input electronic-imaging sources may be derived and implemented according to the teachings of invention of U.S. Pat. No. 5,956,044, or using any of a variety of other methods known by those skilled in the art.

The invention has been described in detail with particular reference to certain preferred embodiments thereof, but it will be understood that variations and modifications can be effected within the spirit and scope of the invention.

The invention claimed is:

1. A color image transformation method comprising the steps of:
    transmission scanning a photographic color-positive transparency media bearing a captured image to provide a scanned image having grayscale mistracking relative to calorimetric chromaticity;
    automatically transforming said scanned image to intermediary color image data encoding values;
    correcting said mistracking during said transforming.

2. The method of claim 1 wherein said scanned image has an overall cyan-blue color balance and said transforming further comprises adjusting said scanned image to remove said overall cyan-blue color balance, said adjusting being independent of said correcting.

3. The method of claim 2 further comprising, prior to said transforming, selecting a reference viewing environment applicable to said color image data encoding values, said reference viewing environment having predetermined surround type, adaptive white point chromaticities, and viewing flare light.

4. The method of claim 3 wherein said transmission scanning further comprises utilizing an illuminant and specifying a spectral power distribution of said illuminant.

5. The method of claim 1 further comprising, prior to said transforming, selecting a reference viewing environment applicable to said color image data encoding values, said reference viewing environment having predetermined surround type, adaptive white point chromaticities, and viewing flare light.

6. The method of claim 1 wherein said transmission scanning further comprises utilizing an illuminant and specifying a spectral power distribution of said illuminant.

7. The method of claim 1 wherein said scanned image has a plurality of color channels and said correcting further comprises applying a respective one-dimensional lookup table to each of said channels.

8. The method of claim 1 further comprising determining mistracking associated with said media prior to said scanning.

9. The method of claim 8 wherein said scanned image has a plurality of color channels and said determining further comprises generating a test pattern exhibiting the grayscale range of neutral colors representing each of said color channels, and determining XYZ colorimetric values for each said neutral color of said test pattern.

10. The method of claim 9 further comprising modifying said XYZ colorimetric values using a nonlinear mathematic transform.

11. A color image transformation method comprising the steps of:
    transmission scanning a photographic color-positive transparency media bearing a captured image to provide a scanned image having an overall cyan-blue color balance and grayscale mistracking relative to colorimetric chromaticity;
    transforming said scanned image to intermediary color image data encoding values, said transforming including adjusting said scanned image to remove said overall cyan-blue color balance; and
    correcting said mistracking during said transforming.

12. The method of claim 11 wherein said adjusting is independent of said correcting.

13. The method of claim 11 wherein said transforming is fully automatic.

14. The method of claim 11 wherein said transforming is responsive to user input.

15. The method of claim 11 wherein said transforming is mediated by metadata.

16. A color image transformation system for use with photographic color-positive transparency media bearing a captured color image, said system comprising:
    a transmission scanner scanning the photographic color-positive transparency media to provide a scanned image having grayscale mistracking relative to calorimetric chromaticity;
    a microprocessor-based unit receiving said scanned image and automatically transforming said scanned image to intermediary color image data encoding values, said microprocessor-based unit correcting said mistracking.

17. The system of claim 16 wherein said scanned image has an overall cyan-blue color balance and said microprocessor-based unit adjusts said scanned image to remove said overall cyan-blue color balance, independent of said correcting.

18. The system of claim 16 wherein said microprocessor-based unit has a plurality of lookup tables, at least one of said lookup tables being associated with said media and usable with said digital image to correct said mistracking.

19. The system of claim 16 wherein said scanned image has a plurality of color channels, said microprocessor-based unit has a plurality of one-dimensional lookup tables, and said correcting further comprises applying a respective one-dimensional lookup table to each of said channels.

20. The system of claim 16 further comprising control apparatus operatively connected to said microprocessor-based unit, said control apparatus being actuable to select a reference viewing environment applicable to said color image data encoding values, said reference viewing environment having predetermined surround type, adaptive white point chromaticities, and viewing flare light.

* * * * *

UNITED STATES PATENT AND TRADEMARK OFFICE
CERTIFICATE OF CORRECTION

PATENT NO. : 7,369,273 B2  Page 1 of 1
APPLICATION NO. : 10/899755
DATED : May 6, 2008
INVENTOR(S) : Thomas E. Madden It is certified that error appears in the above-identified patent and that said Letters Patent is hereby corrected as shown below:

Issued Patent

| Column | Line | Description of Error |
|--------|------|----------------------|
| 13 | 59 | In Claim 1, delete "calorimetric" and insert -- colorimetric --, therefor. |
| 14 | 62-63 | In Claim 16, delete "calorimetric" and insert -- colorimetric --, therefor. |

Signed and Sealed this

Ninth Day of February, 2010

David J. Kappos
*Director of the United States Patent and Trademark Office*